United States Patent
Petullo

(10) Patent No.: US 12,428,143 B2
(45) Date of Patent: Sep. 30, 2025

(54) VARYING A PITCH OF A TILTROTOR

(71) Applicant: The Boeing Company, Arlington, VA (US)

(72) Inventor: Steven Paul Petullo, Bristow, VA (US)

(73) Assignee: THE BOEING COMPANY, Arlington, VA (US)

( * ) Notice: Subject to any disclaimer, the term of this patent is extended or adjusted under 35 U.S.C. 154(b) by 90 days.

(21) Appl. No.: 18/467,799

(22) Filed: Sep. 15, 2023

(65) Prior Publication Data
US 2025/0091713 A1    Mar. 20, 2025

(51) Int. Cl.
*B64C 27/72* (2006.01)

(52) U.S. Cl.
CPC .................................... *B64C 27/72* (2013.01)

(58) Field of Classification Search
CPC ....... B64C 27/72; B64C 27/58; B64C 27/605; B64C 29/0033; B64D 35/026
See application file for complete search history.

(56) References Cited

U.S. PATENT DOCUMENTS

| | | | |
|---|---|---|---|
| 11,820,499 B1 * | 11/2023 | Beno | H02P 27/06 |
| 2018/0155019 A1 * | 6/2018 | Lee | B64C 29/0033 |
| 2022/0396355 A1 * | 12/2022 | Depape | B64C 29/0033 |
| 2024/0124134 A1 * | 4/2024 | German | B64U 50/19 |
| 2024/0246670 A1 * | 7/2024 | Long | B64C 29/0033 |

* cited by examiner

*Primary Examiner* — Courtney D Heinle
*Assistant Examiner* — Ryan C Clark
(74) *Attorney, Agent, or Firm* — MH2 Technology Law Group LLP

(57) ABSTRACT

A tiltrotor includes a plurality of blades that are circumferentially offset from one another. The tiltrotor also includes a pitch mechanism configured to cause the blades to pitch from a first blade pitch to a second blade pitch. The pitch mechanism includes a pitch actuator configured to move from a first pitch actuator position to a second pitch actuator position. The pitch mechanism also includes a link coupled to the pitch actuator. The link is configured to transfer movement from the pitch actuator to the blades to thereby cause the blades to actuate from the first blade pitch to the second blade pitch in response to the pitch actuator moving from the first pitch actuator position to the second pitch actuator position. The link includes a first link portion, a second link portion, and a joint therebetween.

20 Claims, 6 Drawing Sheets

VARYING A PITCH OF A TILTROTOR

TECHNICAL FIELD

The present teachings relate generally to a tiltrotor and, more particularly, to a system and method for making blade angle (i.e., pitch) adjustments to the tiltrotor.

BACKGROUND

A tiltrotor aircraft design combines the vertical takeoff and landing (VTOL) capability of a helicopter with the speed and range of a conventional fixed-wing airplane. For vertical flight, the rotor is angled so the plane of rotation is horizontal, generating lift the way a normal helicopter rotor does. As the aircraft gains speed, the rotor is progressively tilted forward, with the plane of rotation eventually becoming vertical. In this mode, the rotor provides thrust as a propeller, and the airfoil of the fixed wings takes over providing the lift via the forward motion of the entire aircraft. Since the tiltrotor can be configured to be more efficient for propulsion (e.g., with root-tip twist), and it avoids a helicopter's issues of retreating blade stall, the tiltrotor can achieve higher cruise speeds and takeoff weights than helicopters.

SUMMARY

A tiltrotor is disclosed. The tiltrotor includes a plurality of blades that are circumferentially offset from one another. The tiltrotor also includes a pitch mechanism configured to cause the blades to pitch from a first blade pitch to a second blade pitch. The pitch mechanism includes a pitch actuator configured to move from a first pitch actuator position to a second pitch actuator position. The pitch mechanism also includes a link coupled to the pitch actuator. The link is configured to transfer movement from the pitch actuator to the blades to thereby cause the blades to actuate from the first blade pitch to the second blade pitch in response to the pitch actuator moving from the first pitch actuator position to the second pitch actuator position. The link includes a first link portion, a second link portion, and a joint therebetween.

An aircraft is also disclosed. The aircraft includes a tiltrotor. The tiltrotor includes a plurality of blades that are circumferentially offset from one another. The tiltrotor also includes a tilt mechanism configured to cause the blades to tilt from a first blade position to a second blade position. The blades in the first blade position are configured to rotate around a substantially vertical axis such that the blades rotate in a substantially horizontal plane. The blades in the second blade position are configured to rotate around a substantially horizontal axis such that the blades rotate in a substantially vertical plane. The tiltrotor also includes a pitch mechanism configured to cause the blades to pitch from a first blade pitch to a second blade pitch. The pitch mechanism includes a pitch actuator configured to move from a first pitch actuator position to a second pitch actuator position. The pitch mechanism also includes a link coupled to the pitch actuator. The link includes a first link portion, a second link portion, and a joint therebetween. The first link portion and the second link portion are configured to move with respect to one another around the joint in response to the pitch actuator moving from the first pitch actuator position to the second pitch actuator position. The pitch mechanism also includes a pushrod coupled to the first link portion. The pushrod is configured to move in response to movement of the first link portion, which causes the blades to pitch. An angle between a central longitudinal axis through the pushrod and a central longitudinal axis through the first link portion is from about 5 degrees to about 20 degrees.

A method for operating a tiltrotor is also disclosed. The method includes causing a plurality of blades of the tiltrotor to rotate. The blades are circumferentially offset from one another. The blades are part of an aircraft that moves in response to the rotation of the blades. The method also includes causing the blades to pitch from a first blade pitch to a second blade pitch using a pitch mechanism of the tiltrotor. Causing the blades to pitch includes moving a pitch actuator of the pitch mechanism from a first pitch actuator position to a second pitch actuator position. A link coupled to the pitch actuator transfers movement from the pitch actuator to the blades to thereby cause the blades to actuate from the first blade pitch to the second blade pitch in response to the pitch actuator moving from the first pitch actuator position to the second pitch actuator position. The link includes a first link portion, a second link portion, and a joint therebetween.

DRAWINGS

The above and/or other aspects and advantages will become more apparent and more readily appreciated from the following detailed description of examples, taken in conjunction with the accompanying drawings, in which.

DETAILED DESCRIPTION

Figure 1:
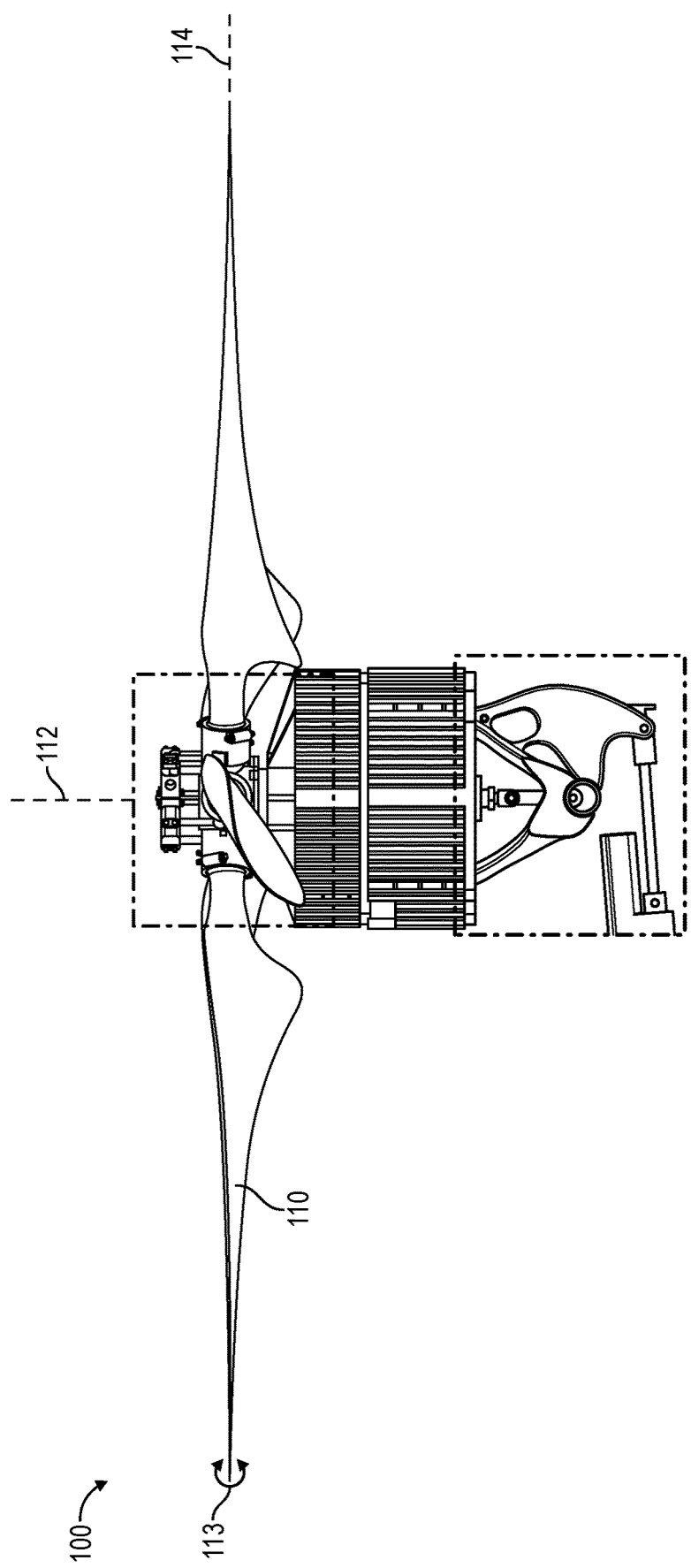
FIG. 1 illustrates a perspective view of a tiltrotor of an aircraft in a first (e.g., hover) mode with blades rotating a substantially horizontal plane, according to an example.

Exemplary aspects will now be described more fully with reference to the accompanying drawings. Examples of the disclosure, however, can be embodied in many different forms and should not be construed as being limited to the examples set forth herein. Rather, these examples are provided so that this disclosure will be thorough and complete, and will fully convey the scope to those skilled in the art. In the drawings, some details may be simplified and/or may be drawn to facilitate understanding rather than to maintain strict structural accuracy, detail, and/or scale.

It will be understood that when an element is referred to as being "on," "associated with," "connected to," "electrically connected to," or "coupled to" another component, it may be directly on, associated with, connected to, electrically connected to, or coupled to the other component or intervening components may be present. In contrast, when a component is referred to as being "directly on," "directly associated with," "directly connected to," "directly electrically connected to," or "directly coupled to" another component, there are no intervening components present. As used herein, the term "and/or" includes any and all combinations of one or more of the associated listed items.

It will be understood that although the terms first, second, etc., may be used herein to describe various elements, components, and/or directions, these elements, components, and/or directions should not be limited by these terms. These terms are only used to distinguish one element, component, and/or direction from another element, component, and/or direction. For example, a first element, component, or direction could be termed a second element, component, or direction without departing from the teachings of examples.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation(s) depicted in the figures.

FIG. 1 illustrates a perspective view of a tiltrotor 100, according to an example. The tiltrotor 100 may be part of an aircraft, which may be an airplane, a helicopter, a spacecraft, an unmanned aerial vehicle (e.g., a drone), or a combination thereof. The tiltrotor 100 may be or include a rotor having a plurality of blades 110 that are circumferentially offset from one another. In the example shown in FIG. 1, the blades 110 are configured to rotate around a substantially vertical axis 112 such that the rotors 110 rotate in a substantially horizontal plane 114. This may be referred to a first blade position, which the aircraft may use to move vertically upward (e.g., take off), hover in place, or move vertically downward (e.g., land).

Figure 2:
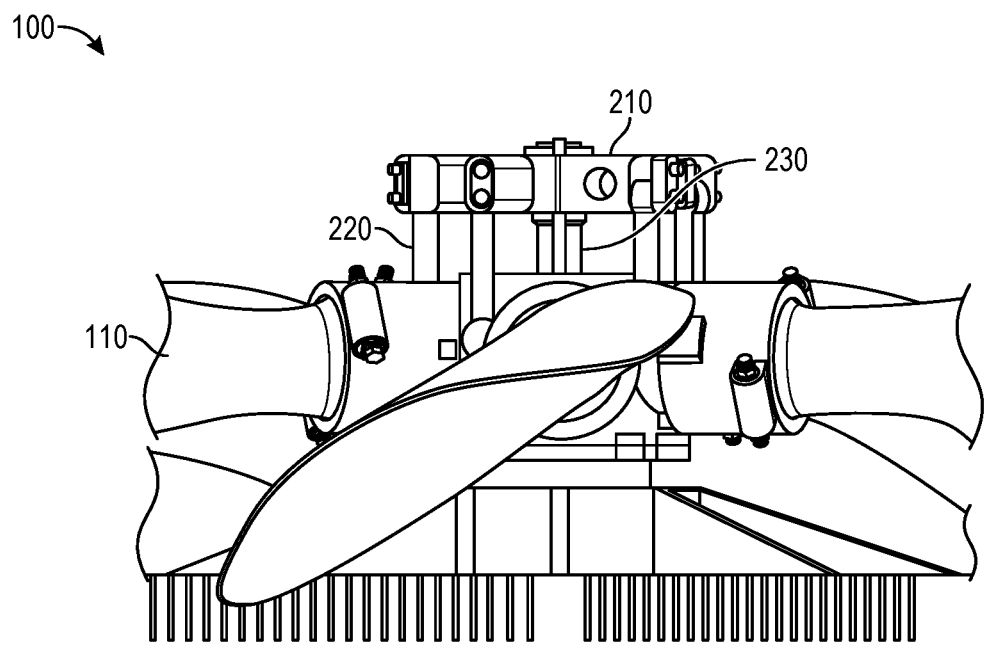
FIG. 2 illustrates an enlarged view of a first (e.g., upper) portion of the tiltrotor in FIG. 1, according to an example.

FIG. 2 illustrates an enlarged view of a first (e.g., upper) portion of the tiltrotor 100 in the first blade position, according to an example. Referring to FIGS. 1 and 2, the tiltrotor 100 may include a collective 210. The tiltrotor 100 may also include one or more pitch links 220 that are coupled to the collective 210, and one or more pushrods 230 that are coupled to the collective 210. As described below, movement of the pushrod 230 may be transferred through the collective 210 and/or the pitch links 220, and thereby cause a pitch (e.g., angle) of the blades 110 to vary.

Figure 3:
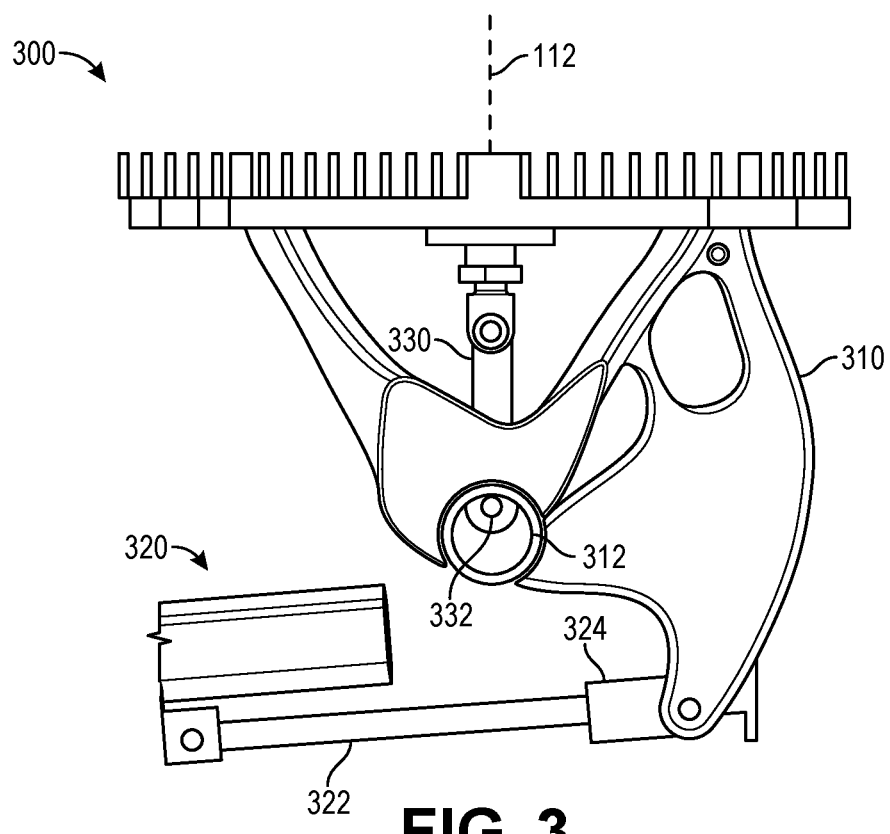
FIG. 3 illustrates an enlarged view of a second (e.g., lower) portion of the tiltrotor in FIG. 1, according to an example.

FIG. 3 illustrates an enlarged view of a second (e.g., lower) portion of the tiltrotor 100 in the first blade position, according to an example. The tiltrotor 100 may also include a tilt mechanism 300 that is configured to cause the blades 110 to tilt from the first blade position to a second blade position. The tilt mechanism 300 may include a bracket 310 positioned below the collective 210, the pitch links 220, the pushrods 230, or a combination thereof. The bracket 310 may define an opening 312 therein through which a pin (not shown) may extend, and the bracket 310 may pivot/rotate around the pin. At least a portion of the tiltrotor 100 (e.g., the blades 110, the collective 210, the pitch links 220, the pushrod 230, the bracket 310 may be configured to rotate around a center of the bracket opening 312.

The tilt mechanism 300 may also include a first (e.g., tilt) actuator 320. The tilt actuator 320 may include a shaft 322 and a sleeve 324. The sleeve 324 may be configured to slide back and forth along the shaft 322 from a first tilt actuator position to a second tilt actuator position. The bracket 310 may be coupled to (and move together with) the sleeve 324.

The blades 110 may be in the first blade position when the bracket 310 and/or the sleeve 324 are in the first tilt actuator position relative to the shaft 322 (e.g., proximate to the right end of the shaft 322 in FIGS. 1 and 3).

The tiltrotor 100 may also include a link 330. A first (e.g., upper) end portion of the link 330 may be coupled to a (e.g., lower) end portion of the push rod 230. A second (e.g., lower) end portion of the link 330 may be positioned at least partially within the opening 312 in the bracket 310. The second (e.g., lower) end portion of the link 330 may also define an opening 332 through which a pin (not shown) may extend, and the link 330 may pivot/rotate around the pin. The link 330 may be configured to rotate around a center of the link opening 332. The link opening 332 may be smaller than the bracket opening 312. The link opening 332 may be positioned at least partially within the bracket opening 312 (i.e., at least partially overlap). A center of the link opening 332 may be offset 313 (see FIG. 5) from a center of the bracket opening 312. In the example shown, the center of the link opening 332 may be (e.g., directly) above the center of the bracket opening 312 (e.g., such that the vertical axis 112 extends through both centers when the blades 110 are in the first blade position. This offset 313 may cause the blade pitch angle to change as the tiltrotor 100 tilts or rotates about the center of the bracket opening 312.

Figure 4:
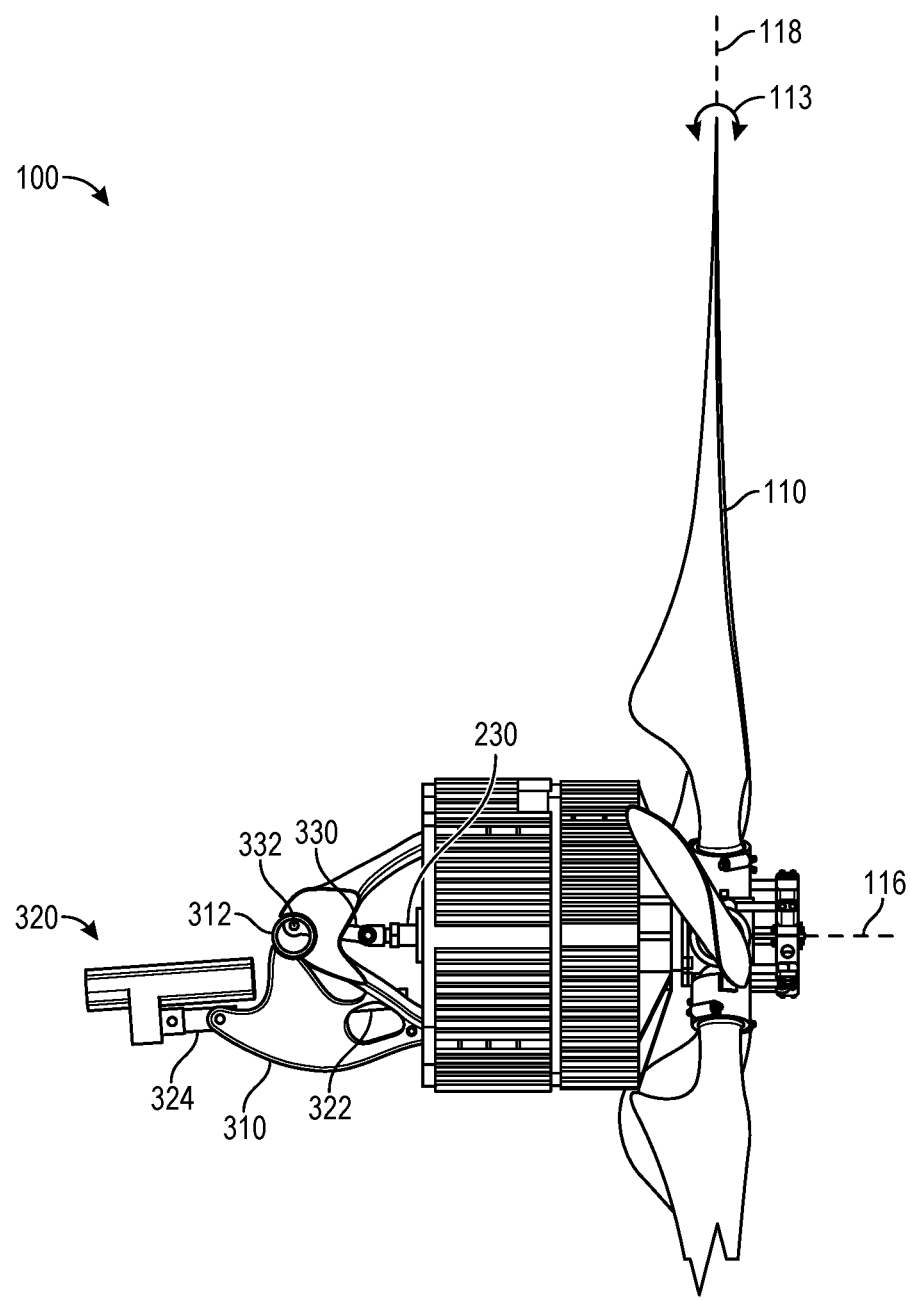
FIG. 4 illustrates a perspective view of the tiltrotor of the aircraft in a second (e.g., cruise) mode with the blades rotating in a substantially vertical plane, according to an example.

FIG. 4 illustrates a perspective view of the tiltrotor 100 of the aircraft with the blades 110 in a second blade position, according to an example. As mentioned above, the tilt actuator 320 may move the sleeve 324 (and the bracket 310 coupled thereto) to the second tilt actuator position (e.g., to the left end of the shaft 322 in FIG. 4) to actuate the blades 110 into the second blade position. In the second blade position, the blades 110 are configured to rotate around a substantially horizontal axis 116 such that the blades 110 rotate in a substantially vertical plane 118. The second blade position may allow the aircraft to move forward (e.g., cruise).

Figure 5:
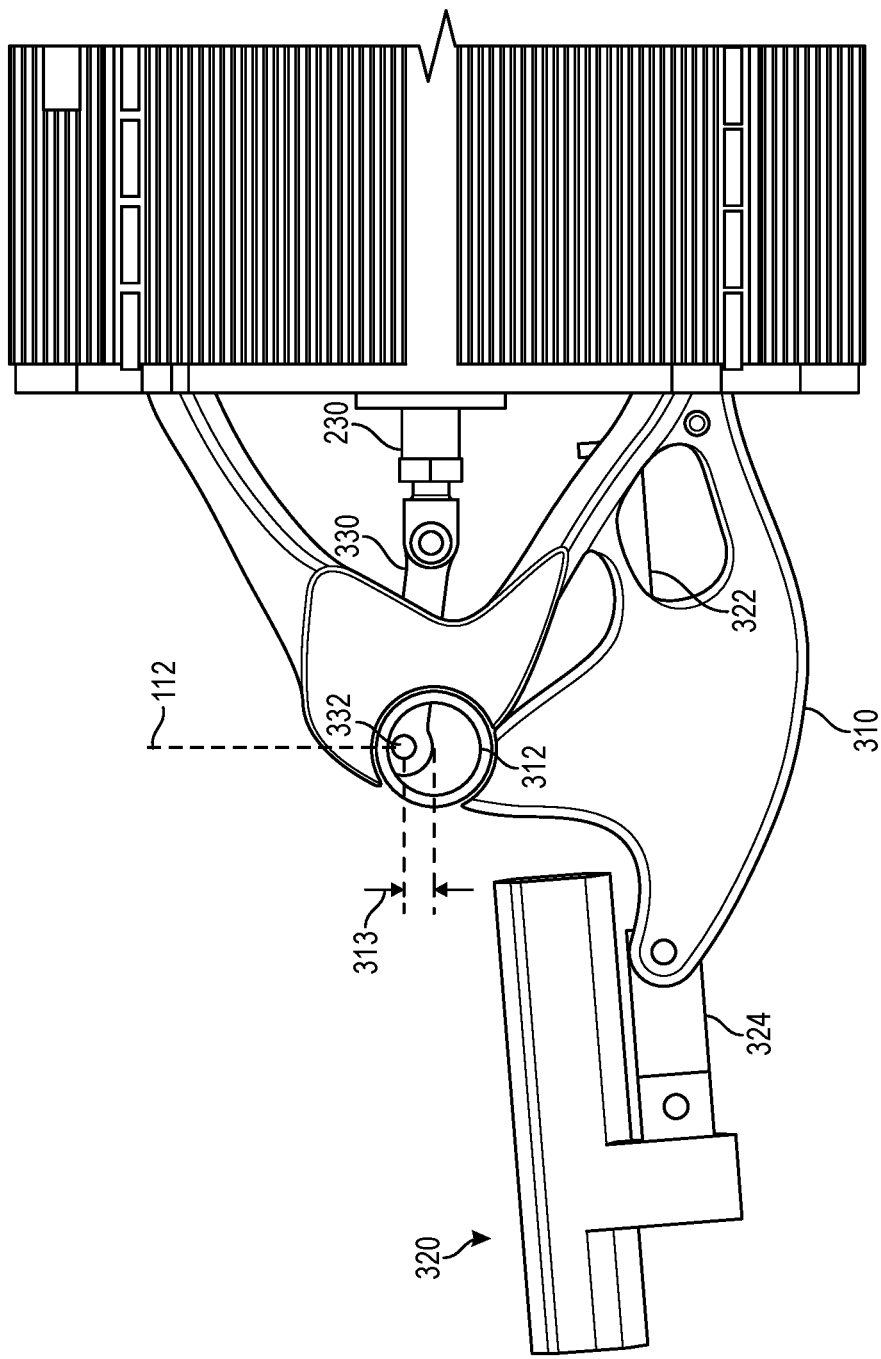
FIG. 5 illustrates an enlarged view of the second portion of the tiltrotor in FIG. 4, according to an example.

FIG. 5 illustrates an enlarged view of the second portion of the tiltrotor 100 in FIG. 4, according to an example. The center of the link opening 332 may be (e.g., remain) offset from the center of the bracket opening 312 (e.g., by the same offset distance 313) when the blades 110 are in the second blade position. In addition, the center of the link opening 332 may be (e.g., remain) above the center of the bracket opening 312 such that the vertical axis 112 extends through both centers when the blades are in the second blade position.

Figure 6:
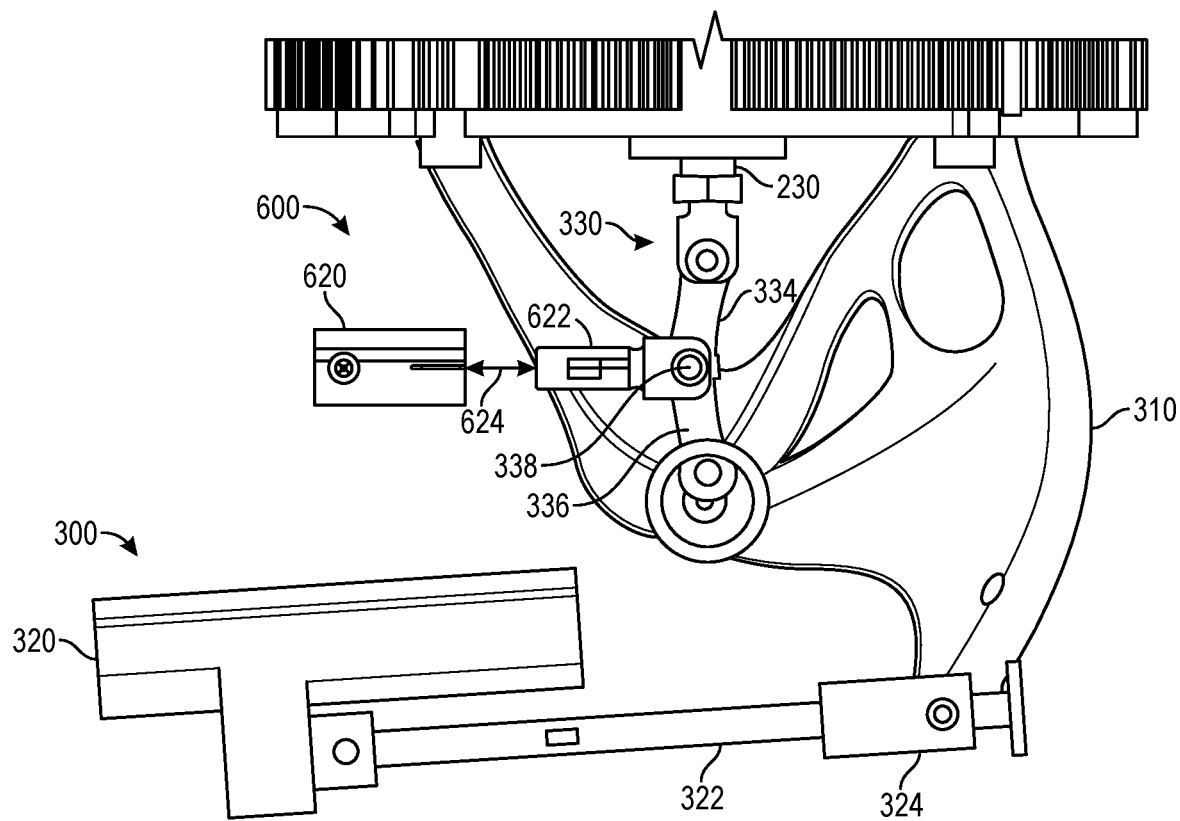
FIG. 6 illustrates another enlarged view of the second portion of the tiltrotor, according to an example.
Figure 7:
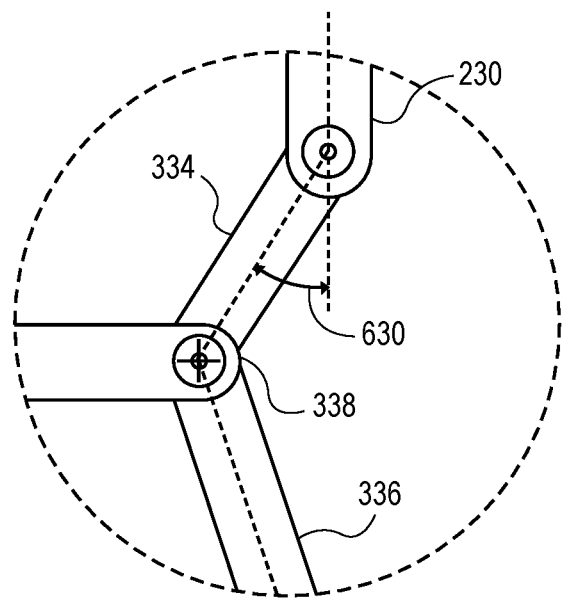
FIG. 7 illustrates an enlarged view of a portion of FIG. 6, according to an embodiment.

FIG. 6 illustrates another enlarged view of the second portion of the tiltrotor 100 with the blades 110 back in the first blade position, according to an example. As shown, the link 330 may include a first (e.g., upper) portion 334 and a second (e.g., lower) portion 336 with a joint (also referred to as a knee) 338 therebetween. The link portions 336, 338 may be configured to rotate with respect to one another around the joint 338, as described below.

The tiltrotor 100 may also include a pitch mechanism 600. The pitch mechanism 600 may be configured to cause the blades 110 to pitch from a first blade pitch to a second blade pitch, as shown by the arrows 113 in FIGS. 1 and 4 where the blades 110 rotate around a central longitudinal axis therethrough.

Referring back to FIG. 6, the pitch mechanism 600 may include a second (e.g., pitch) actuator 620. The pitch actuator 620 may include a shaft 622. The shaft 622 may be coupled to the link 330 (e.g., the upper link portion 334, the lower link portion 336, and/or the joint 338). The pitch actuator 620 (e.g., the shaft 622) may be configured to reciprocate along a length thereof (e.g., extend and retract) as shown by arrows 624 from a first pitch actuator position to a second pitch actuator position. The link 330 may transfer the movement of the pitch actuator 620 through the pushrods 230, collective 210, and/or the pitch links 220, to the blades 110. More particularly, the blades 110 may actuate from the first blade pitch to the second blade pitch in response to the pitch actuator 620 moving from the first pitch actuator position to the second pitch actuator position.

The first link portion 334 and the pitch rod 230 may be oriented at an angle 630 with respect to one another. The angle 630 may vary from about 5 degrees to about 20 degrees. For example, the angle 630 may be from about 5 degrees to about 10 degrees in the first pitch actuator position, and the angle 630 may be from about 15 degrees to about 20 degrees in the second pitch actuator position.

The small angle 630 may result in lower forces exerted by the pitch actuator 620 than required by conventional tiltrotors, and therefore the pitch actuator 620 may be smaller and/or lighter than would be required for a full collective stroke over the entire pitch range. In addition, the pitch actuator 620 may be non-redundant because its failure would have a limited impact on the blade angle, provided that the pitch actuator 620 is not back-drivable. Moreover, pitch actuator 620 may not see the (e.g., full) axial force exerted by and/or onto the pushrod 230.

The actuation of the pitch actuator 620 (and the variation of the angle 630) may cause the blades 110 to pitch back and forth (e.g., as shown by arrows 113 in FIG. 1). The pitch actuator 620 may cause the blades 110 to pitch (i.e., the blade angle to vary) when the blades 110 are in the first blade position, the second blade position, or tilting therebetween. More particularly, the pitch actuator 620 may allow for fast and fine control of the angle of the blades 110 while the blades 110 are tilting between the two blade positions, which may have the benefit of providing enhanced flight control of the aircraft.

Figure 8:
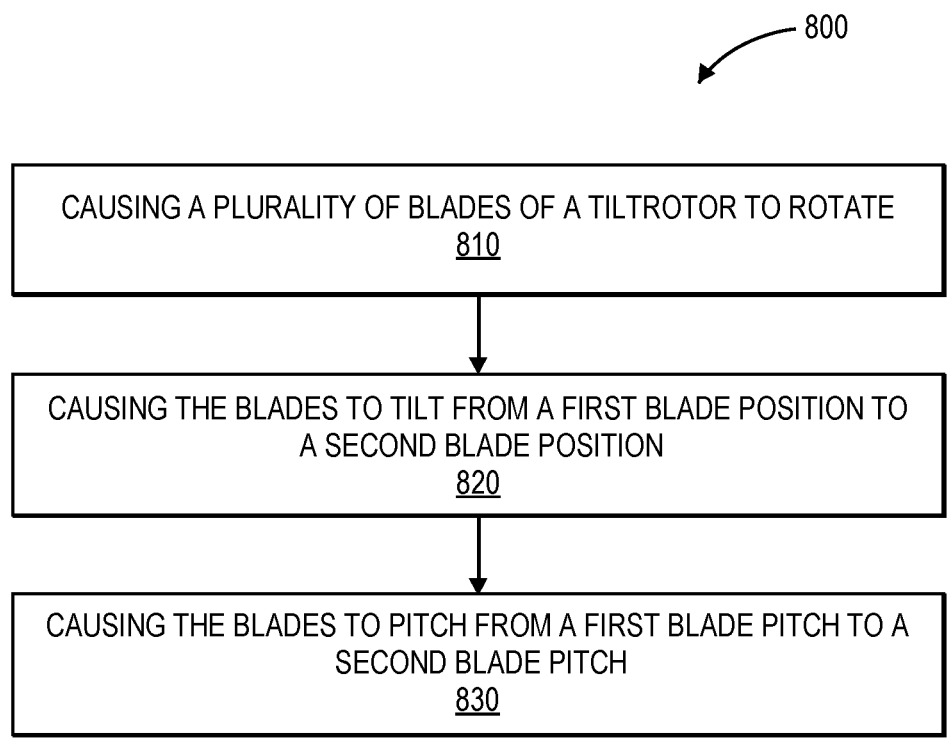
FIG. 8 illustrates a flowchart of a method for operating the tiltrotor, according to an embodiment.

FIG. 8 illustrates a flowchart of a method 800 for operating the tiltrotor 100, according to an embodiment. An illustrative order of the method 800 is provided below, however, one or more steps of the method 800 may be performed in a different order, simultaneously, repeated, or omitted.

The method 800 may include causing the blades 110 of the tiltrotor 100 to rotate, as at 810. The aircraft may move in response to the rotation of the blades. More particularly, the aircraft may take off (e.g., move vertically upward), hover, cruise forward, and/or land (e.g., move vertically downward).

The method 800 may also include causing the blades 110 to tilt from a first blade position to a second blade position, as at 820. This may include actuating the tilt mechanism 300 (e.g., the tilt actuator 320) from the first tilt actuator position to the second tilt actuator position, or vice versa. In response to this, the blades 110 may actuate from the first blade position (FIG. 1) to the second blade position (FIG. 4), or vice versa.

The method 800 may also include causing the blades 110 to pitch from a first blade pitch to a second blade pitch, as at 830. This may include actuating the pitch mechanism 600 (e.g., the pitch actuator 620) from the first pitch actuator position to the second pitch actuator position, or vice versa. In response to this, the blades 110 may actuate from the first blade pitch to the second blade pitch, or vice versa. As mentioned above, the link 330 may transfer the movement from the pitch actuator 620 (through the pushrod 230, collective 210, and/or pitch links 220) to the blades 110. In one embodiment, the blades 110 may pitch between the first blade pitch and the second blade pitch at a frequency between about 0.5 Hz and 10 Hz or about 1 Hz to about 5 Hz simultaneously with the blades 110 tilting (e.g., one time) between the first blade position and the second blade position. This may be referred to as dithering.

While the foregoing disclosure has been described in some detail by way of illustration and example for purposes of clarity and understanding, it will be clear to one of ordinary skill in the art from a reading of this disclosure that various changes in form and detail can be made without departing from the true scope of the disclosure and may be practiced within the scope of the appended claims. For example, all the methods, systems, and/or component parts or other aspects thereof can be used in various combinations. All patents, patent applications, websites, other publications or documents, and the like cited herein are incorporated by reference in their entirety for all purposes to the same extent as if each individual item were specifically and individually indicated to be so incorporated by reference.

What is claimed is:

1. A tiltrotor, comprising:
a plurality of blades that are circumferentially offset from one another; and
a pitch mechanism configured to cause the blades to pitch from a first blade pitch to a second blade pitch, wherein the pitch mechanism comprises:
a pitch actuator configured to move from a first pitch actuator position to a second pitch actuator position; and
a link coupled to the pitch actuator, wherein the link is configured to transfer movement from the pitch actuator to the blades to thereby cause the blades to actuate from the first blade pitch to the second blade pitch in response to the pitch actuator moving from the first pitch actuator position to the second pitch actuator position, wherein the link comprises a first link portion, a second link portion, and a joint therebetween, and wherein the pitch actuator is coupled to the joint.

2. The tiltrotor of claim 1, wherein each blade is configured to rotate around a central longitudinal axis therethrough to actuate between the first blade pitch and the second blade pitch.

3. The tiltrotor of claim 1, wherein the first link portion is oriented at a first angle with respect an axis around which the blades rotate when the pitch actuator is in the first pitch actuator position, wherein the first link portion is oriented at a second angle with respect to the axis when the pitch actuator is in the second pitch actuator position, and wherein the first and second angles are different.

4. The tiltrotor of claim 3, wherein the first angle is from 5 degrees to 10 degrees, and wherein the second angle is from 15 degrees to 20 degrees.

5. The tiltrotor of claim 1, further comprising a tilt mechanism configured to cause the blades to tilt from a first blade position to a second blade position.

6. The tiltrotor of claim 5, wherein the blades in the first blade position are configured to rotate around a vertical axis such that the blades rotate in a horizontal plane, and wherein the blades in the second blade position are configured to rotate around a horizontal axis such that the blades rotate in a vertical plane.

7. The tiltrotor of claim 5, wherein the tilt mechanism comprises:
a tilt actuator; and a bracket coupled to the tilt actuator, wherein the bracket is configured to transfer movement from the tilt actuator to the blades to thereby cause the blades to actuate from the first blade position to the second blade position in response to the tilt actuator moving from a first tilt actuator position to a second tilt actuator position.

8. The tiltrotor of claim 7, wherein the bracket comprises a bracket opening, wherein the second link portion comprises a link opening, and wherein the bracket opening and the link opening at least partially overlap with one another.

9. The tiltrotor of claim 8, wherein a center of the bracket opening is offset from a center of the link opening.

10. The tiltrotor of claim 9, wherein the bracket is configured to rotate around the center of the bracket opening, and wherein the link is configured to rotate around the center of the link opening.

11. A method for operating a tiltrotor, the method comprising:
  causing a plurality of blades of the tiltrotor to rotate, wherein the blades are circumferentially offset from one another, and wherein the blades are part of an aircraft that moves in response to the rotation of the blades; and
  causing the blades to pitch from a first blade pitch to a second blade pitch using a pitch mechanism of the tiltrotor, wherein causing the blades to pitch comprises moving a pitch actuator of the pitch mechanism from a first pitch actuator position to a second pitch actuator position, wherein a link coupled to the pitch actuator transfers movement from the pitch actuator to the blades to thereby cause the blades to actuate from the first blade pitch to the second blade pitch in response to the pitch actuator moving from the first pitch actuator position to the second pitch actuator position, wherein the link comprises a first link portion, a second link portion, and a joint therebetween, and wherein the pitch actuator is coupled to the joint.

12. An aircraft, comprising:
  a tiltrotor comprising:
    a plurality of blades that are circumferentially offset from one another;
    a tilt mechanism configured to cause the blades to tilt from a first blade position to a second blade position, wherein the blades in the first blade position are configured to rotate around a vertical axis such that the blades rotate in a horizontal plane, and wherein the blades in the second blade position are configured to rotate around a horizontal axis such that the blades rotate in a vertical plane;
    a pitch mechanism configured to cause the blades to pitch from a first blade pitch to a second blade pitch, wherein the pitch mechanism comprises:
      a pitch actuator configured to move from a first pitch actuator position to a second pitch actuator position;
      a link comprising a first link portion, a second link portion, and a joint therebetween, wherein the pitch actuator is coupled to the joint, and wherein the first link portion and the second link portion are configured to move with respect to one another around the joint in response to the pitch actuator moving from the first pitch actuator position to the second pitch actuator position; and
      a pushrod coupled to the first link portion, wherein the pushrod is configured to move in response to movement of the first link portion, which causes the blades to pitch, and wherein an angle between a central longitudinal axis through the pushrod and a central longitudinal axis through the first link portion is from 5 degrees to 20 degrees; and
    a bracket coupled to the tilt mechanism and the pitch mechanism, wherein the bracket comprises a bracket opening, wherein the second link portion comprises a link opening, and wherein the bracket opening and the link opening at least partially overlap with one another.

13. The aircraft of claim 12, wherein the tilt mechanism comprises:
  a tilt actuator comprising:
    a shaft; and
    a sleeve configured to slide along the shaft from a first tilt actuator position to a second tilt actuator wherein the bracket is coupled to the sleeve of the tilt actuator, wherein the bracket is configured to transfer movement from the sleeve to the blades to thereby cause the blades to actuate from the first blade position to the second blade position in response to the sleeve moving from the first tilt actuator position to the second tilt actuator position.

14. The aircraft of claim 12, wherein a center of the bracket opening is offset from a center of the link opening.

15. The aircraft of claim 14, wherein the blades tilt around the center of the bracket opening as the blades actuate from the first blade position to the second blade position.

16. The aircraft of claim 14, wherein the center of the bracket opening is positioned directly below the center of the link opening in the first blade position and the second blade position.

17. The aircraft of claim 12, wherein the angle is from 5 degrees to 10 degrees in the first pitch actuator position, and wherein the angle is from 15 degrees to 20 degrees in the second pitch actuator position.

18. The aircraft of claim 12, wherein an angle between the first and second link portions differs in the first pitch actuator position and the second pitch actuator position.

19. The aircraft of claim 14, wherein the center of the link opening is above the center of the bracket opening, such that the vertical axis extends through both centers, when the blades are in the first blade position and the second blade position.

20. The aircraft of claim 14, wherein the center of the link opening remains offset from the center of the bracket opening by a same distance when the blades actuate from the first blade position to the second blade position.

* * * * *